United States Patent [19]

Adams et al.

[11] Patent Number: 5,513,763
[45] Date of Patent: May 7, 1996

[54] CAP FOR FLUID CONTAINER WITH THREADED NECK

[75] Inventors: Brian M. Adams, Newark; Daniel Luch, Morgan Hill, both of Calif.

[73] Assignee: Portola Packaging, Inc., San Jose, Calif.

[21] Appl. No.: 368,752

[22] Filed: Jan. 4, 1995

Related U.S. Application Data

[63] Continuation of Ser. No. 16,577, Feb. 10, 1993, abandoned, which is a continuation-in-part of Ser. No. 772,949, Oct. 8, 1991, Pat. No. 5,232,125.

[51] Int. Cl.⁶ .................................... B65D 41/34
[52] U.S. Cl. ........................... 215/254; 215/44; 215/317; 215/321; 215/330; 215/331; 215/348; 215/349; 215/352; 141/18; 141/319; 141/354; 141/375
[58] Field of Search ...................... 215/350, 252, 215/253, 254, 317, 318, 321, 348, 349, 352, 330, 331, 44; 220/254, 270; 141/363, 375, 351, 354, 357, 18, 319, 330, 346; 222/83.5, 146.6, 129, 484, 153; 62/391

[56] References Cited

U.S. PATENT DOCUMENTS

| | | | |
|---|---|---|---|
| 3,392,860 | 7/1968 | Faulstich . | |
| 3,979,002 | 9/1976 | Faulstich . | |
| 4,093,096 | 6/1978 | Augros | 215/330 |
| 4,354,609 | 10/1982 | Hidding | 215/252 |
| 4,364,483 | 12/1982 | Golde | 215/218 |
| 4,460,100 | 7/1984 | Libit | 215/237 |
| 4,461,394 | 7/1984 | Sendel et al. | 215/330 |
| 4,527,704 | 7/1985 | Swartzbaugh | 215/252 |
| 4,527,706 | 7/1985 | Swartzbaugh et al. | 215/252 |
| 4,658,977 | 4/1987 | Crisci | 215/256 |
| 4,736,859 | 4/1988 | Mayes et al. | 215/330 |
| 4,946,055 | 8/1990 | Towns et al. | 215/254 |
| 4,948,003 | 8/1990 | Munoz | 215/237 |
| 5,123,555 | 6/1992 | Luch . | |
| 5,188,628 | 2/1993 | Rani et al. | 604/405 |
| 5,203,838 | 4/1993 | Schneider | 215/253 |

FOREIGN PATENT DOCUMENTS

| | | | |
|---|---|---|---|
| 0118267 | 10/1986 | European Pat. Off. | 215/318 |
| 448753 | 5/1949 | Italy | 215/254 |

*Primary Examiner*—Allan N. Shoap
*Assistant Examiner*—Stephen Cronin
*Attorney, Agent, or Firm*—Julian Caplan; Flehr, Hohbach, Test, Albritton & Herbert

[57] ABSTRACT

The present invention employs a plastic snap-on cap which engages both the neck crown of a container having a rectangular body and a neck having screw threads and is internally threaded to engage the neck threads of the conventional container. A foam gasket under the top of the cap prevents leakage by sealing against the neck lip. The cap has internal threads which snap over and then engage under the neck threads. Vertical "barriers" below the cap threads prevent unscrewing the cap so long as the cap skirt is intact. Score lines extend from the bottom edge of the cap skirt to above the internal cap bead which engages the neck crown and extend up to the cap threads. A tear tab is used to tear a vertical strip of the skirt which extends up between the score lines. The cap is thus tamper-evident since it cannot be removed so long as the cap is intact but can be removed by tearing the aforementioned strip. In one modification, a well is formed in the center of the cap. The open bottom of the well is closed by a plug which engages the upper end of a water-cooler dispenser tube and is pushed into the container when in use and returned to closed position when the container is removed from the dispenser.

12 Claims, 3 Drawing Sheets

CAP FOR FLUID CONTAINER WITH THREADED NECK

CROSS-REFERENCE TO RELATED APPLICATIONS

This is a continuation of application Ser. No. 08/016,577 filed Feb. 10, 1993, now abandoned which was a continuation-in-part of application Ser. No. 07/772,949 filed Oct. 8, 1991 now U.S. Pat. No. 5,232,125 issued Aug. 3, 1993.

BACKGROUND OF THE INVENTION

1. Field of the Invention

This invention relates to a new and improved cap for a fluid container with threaded neck. More particularly, the invention relates to a snap-on cap for a bottle neck having a crown finish with a super-imposed threaded finish.

2. Description of the Related Art

Plastic push-on bottle caps for use with container necks having a crown finish with a super-imposed threaded finish are shown in U.S. Pat. Nos. 3,392,860 and 3,979,002 as well as elsewhere in the art. The present invention provides a cap which engages both the crown finish of the neck and the threaded finish. Further, means is provided whereby the cap cannot be removed from the neck without tearing off a portion of the cap and hence the cap is tamper-evident. The use of an external rib to engage the inside of a water dispenser and cooler is shown in U.S. Pat. No. 5,123,555.

Push-on caps have been in public use by the assignee of this Application. However, the use of barriers to prevent unscrewing the cap has not previously been known in the art.

The use of foam disks on the undersides of the tops of plastic caps to seal against the lip of a neck are also known in the art.

SUMMARY OF INVENTION

Two basic forms of cap are disclosed, both used to close the neck of a bottle of the type having a crown positioned below the lip with a restricted diameter portion above the crown and a screw thread around the restricted diameter portion. Bottles of this type have been used commercially. The lower portion of the bottle is usually rectangular in cross-section so that a plurality of bottles may be stacked on top of each other without the necessity of using pallets. Such bottles have heretofore been closed by a metal screw cap having threads engaging the threads on the bottle. To make the system tamper-evident, a plastic snap-on overcap has been used. However, stacking of bottles causes increased hydraulic pressure to be exerted on the bottom bottles, and this is aggravated by hydraulic "hammer" resulting from transportation by truck. This has resulted in leakage.

The use of a metal screw cap has been found somewhat undesirable because of its tendency to rust.

Another development in use in water bottles is the emergence of a type cap which remains on the bottle and is provided with sealing means to prevent leakage from the bottle when it is installed in a water dispenser and also when it has been removed. The aforesaid metal caps and plastic overcaps have not been found adaptable to this new development.

The use of caps, such as shown in U.S. Pat. Nos. 3,392,860 and 3,979,002, in stacked bottle installations has been found to be unsatisfactory, because during transport the "hydraulic hammer" forces the cap upward on the neck. If a foam liner is used under the top of the cap, such liner tends to separate from the neck as the cap is forced upward.

In one form of the present invention, a plastic push-on type cap is used having a top under which is installed foam plastic disk gasket. The skirt of the cap has a restricted diameter upper portion which is internally threaded. Vertical "barriers" are formed below the internal thread, preventing the cap from being removed from the neck threads so long as the cap is intact. Below the restricted upper portion, the skirt expands outwardly and has an internal locking bead which snaps over and engages the underside of the crown finish of the neck. The lower skirt portion extends downwardly and frictionally engages the exterior of the neck.

Vertical tear lines extend up from the bottom edge of the cap to the region of the internal threads and a tear tab is provided which, when pulled, tears the cap along the score lines.

In installing the cap, the tear tab provides an orientation means which aligns the cap threads with respect to the neck threads so that when the cap is forced axially downwardly over the neck, the cap threads expand outwardly to clear the neck threads and then contract to mate with the neck threads, thereby insuring that the cap does not have to be screwed onto the neck. Simultaneously, the lower portion of the skirt seats on the crown of the cap and the locking bead seats under the crown bead of the neck.

In a modification the barriers are formed on the external threads of the neck rather than on the internal threads of the cap.

In another form of the invention, the cap is formed with a central well in the top, and the open bottom of the well is closed by a plug. In this form of the invention, the foam gasket under the cap top is in the form of an annular ring which seals against the neck lip.

The foregoing cap remains on the bottle as it is installed in the water dispenser. A probe in the dispenser engages the plug, permitting water to flow into the dispenser and permitting air to flow into the bottle to displace the water dispensed. The probe engages the plug and pushes it into the bottle as the bottle is fully seated in the dispenser. When the bottle is removed from the dispenser, the probe retracts the plug into the well thereby preventing water from spilling as the bottle is withdrawn from the dispenser. In other respects the second type cap resembles that of the two previously mentioned cap and neck combinations.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Figure 1:
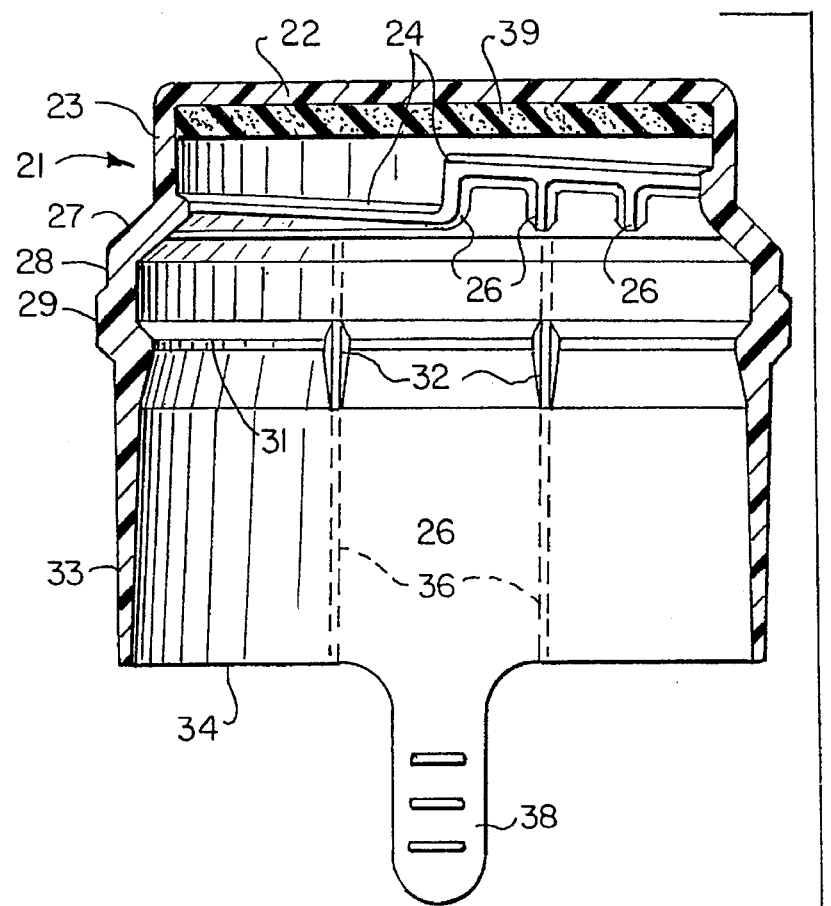
FIG. 1 is an exploded view of a neck and a cap, the cap being cut away in vertical cross-section.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

The cap of the present invention is used on a water bottle, the body of which (not shown) is generally rectangular in cross-section so that a number of bottles which are horizontally disposed may be stacked on top of each other. The neck 11 of such a bottle has a lip 12 from which depends a restricted diameter cylindrical vertical stretch 13. One turn of screw thread 14 is applied to the stretch 13 and is generally slightly greater than 360° in extent. Below vertical stretch 13 is an enlarged external bead or crown 16 and below the crown 16 is a concave portion 17 and below portion 17 is a generally cylindrical portion 18.

Figure 2:
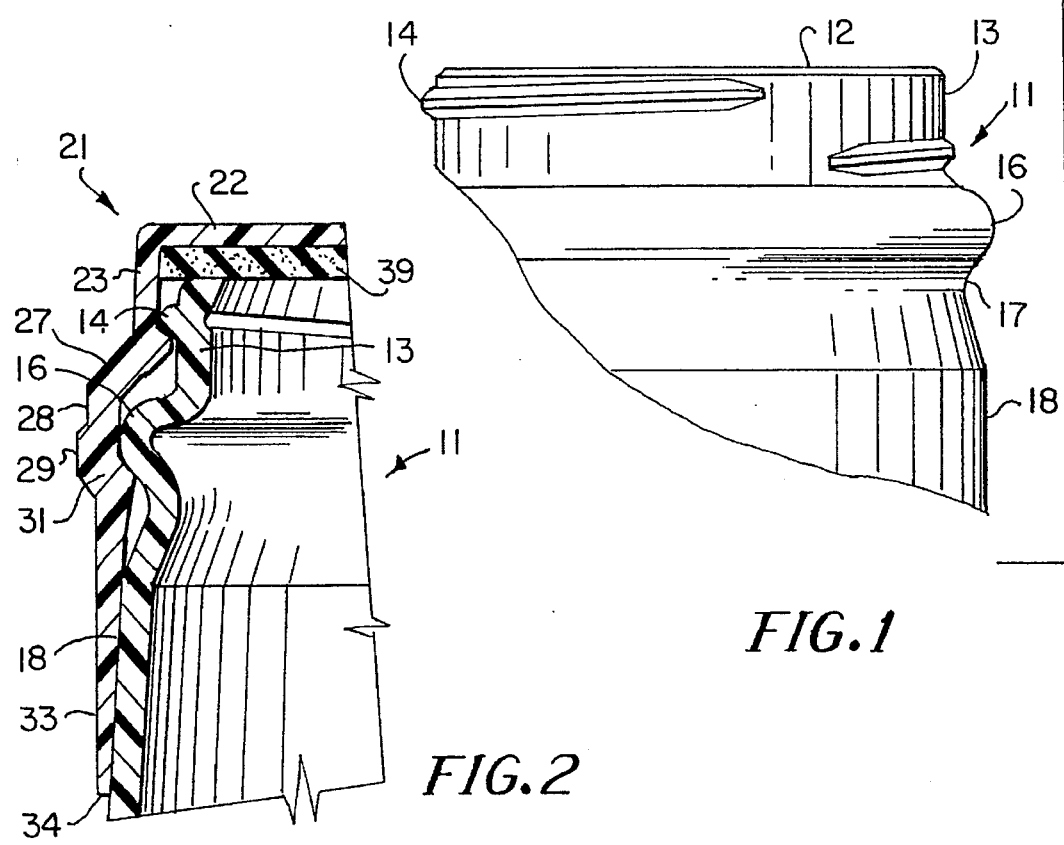
FIG. 2 is a fragmentary, vertical sectional view through the cap and neck in assembled condition.

In the form of the invention shown in FIGS. 1 and 2, cap 21 has a top 22 which is circular and a vertical skirt stretch 23 depends from the periphery of top 22. A slightly less than 360° internal screw thread 24 is formed on the interior of the vertical stretch 23. Vertical barriers 26 are formed on the interior surface of stretch 23 extending downwardly from thread 24. One barrier 26 extends down from the top of thread 24 (herein 0° of angle) to the level of the lower end of thread 24 (herein 360° of angle) and other barriers 26 are angularly spaced apart along thread 24 and also extend to the level of the lower end of thread 24. The presence of barriers 26 prevents the cap from being removed, so long as the cap is intact. An alternative is to place barriers on the bottle neck as shown by 66, FIG. 5 as described below.

Below vertical stretch 23 cap 21 expands downwardly and outwardly in a slanted stretch 27 and below the stretch 27 is a second vertical stretch 28. On the exterior of the lower portion of stretch 28 is a flat outer bead 29. On the interior of bead 29 is an internal locking bead 31 which engages under crown 16 of neck 11. Below locking bead 31 the skirt 33 tapers downwardly to engage the surface 18 of neck 11 below concave portions 17.

Extending below bottom edge 34 of skirt 33 is a tear tab 38. To either side of tab 38 extending upward from bottom edge 34 are score lines 36 which extend vertically upwardly to about the level of slanted stretch 27.

Breaks 32 in the otherwise continuous locking bead 31 allow the thinned score lines to extend to the slanted stretch 27.

A foam disk 39 which is circular in shape is installed on the underside of top 22.

At the time of installation of cap 21 on neck 11, tear tab 38 is oriented with respect to the threads 14 and threads 14 are easily oriented by reason of the rectangular cross-section of the body of the bottle. When the cap 21 is pushed axially downwardly without rotation onto neck 11, bead 31 slips over the crown 16. Thread 24 expands and slips over thread 14. By reason of the orientation of the cap 21 relative to the neck 11, the threads 24 and 14 interengage tightly and there is no need to screw the cap onto the neck. Foam disk 39 seals on the lip 12. Despite water hammer during transportation, the foam disk 39, the seating of the threads 14 and 24 and the seating of the bead 31 and crown 16 make the cap water-tight. Furthermore, it is also tamper-evident since the barriers 26 prevent the cap from being unscrewed so long as the cap is intact.

The consumer grips the tear tab 38 and pulls upwardly so that the cap tears along the tear lines 36. With the lower portion of the cap loosened it is possible for the consumer to then remove the upper portion of the cap, providing access to the contents of the container.

Figures 3, 4:
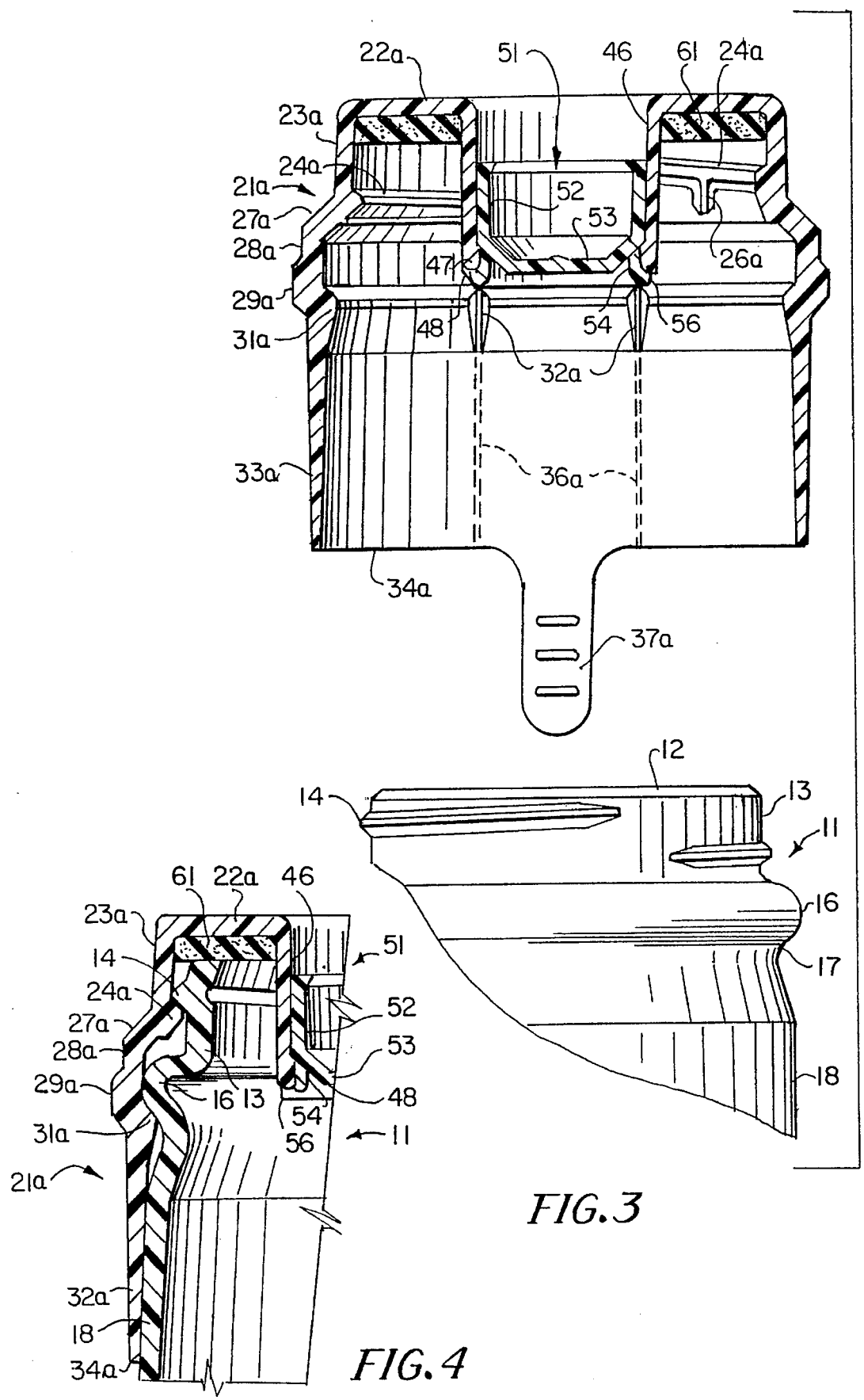
FIG. 3 is a view similar to FIG. 1 of a modified cap.
FIG. 4 is a view similar to FIG. 2 of the modification of FIG. 3.

Turning now to the embodiment shown in FIGS. 3 and 4 of the drawings, the neck 11 of the container is identical to that of the preceding modification. The top 22a is formed with a central well 46. An internal bead 47 is formed near the bottom of well 46 and above the open end 48 thereof. Slidable within well 46 is a plug 51 having a cylindrical body 52 and a closed lower end 53. An extension 54 below body 52 and end 53 is engaged by bead 47. Below end 48 is an outward extending flange 56. In this form of cap, there is an annular foam ring 61 which seals against lip 12.

The cap 21a is installed on neck 11 in essentially the same manner as the cap of FIGS. 1 and 2. The cap is intended for use with a particular type water dispenser and when used with such a dispenser the cap 21a is not removed by the consumer. Upon inversion of the container, a probe on the water dispenser (not shown) pushes plug 51 so that air enters the bottle and water begins to be emitted. The plug 51 seats on the probe with the result that after the plug 51 is pushed out from the well 46 and into the interior of the bottle, it remains attached to the dispenser probe. After the contents of the bottle have been substantially depleted, when the bottle is removed, the probe of the dispenser pulls the plug 51 back into the well 46 so that the remaining content of the bottle does not spill.

When the bottle is returned to the bottling works, the tear tab 37a is pulled, enabling the cap 21a to be removed from the neck and discarded. In many respects the modification of the invention shown in FIGS. 3 and 4 resembles that of the preceding modification and the same reference numerals followed by the subscript a are used to designate corresponding parts.

It will be understood that threads 14, 14a, 24 and/or 24a may be continuous or interrupted.

Figure 5:
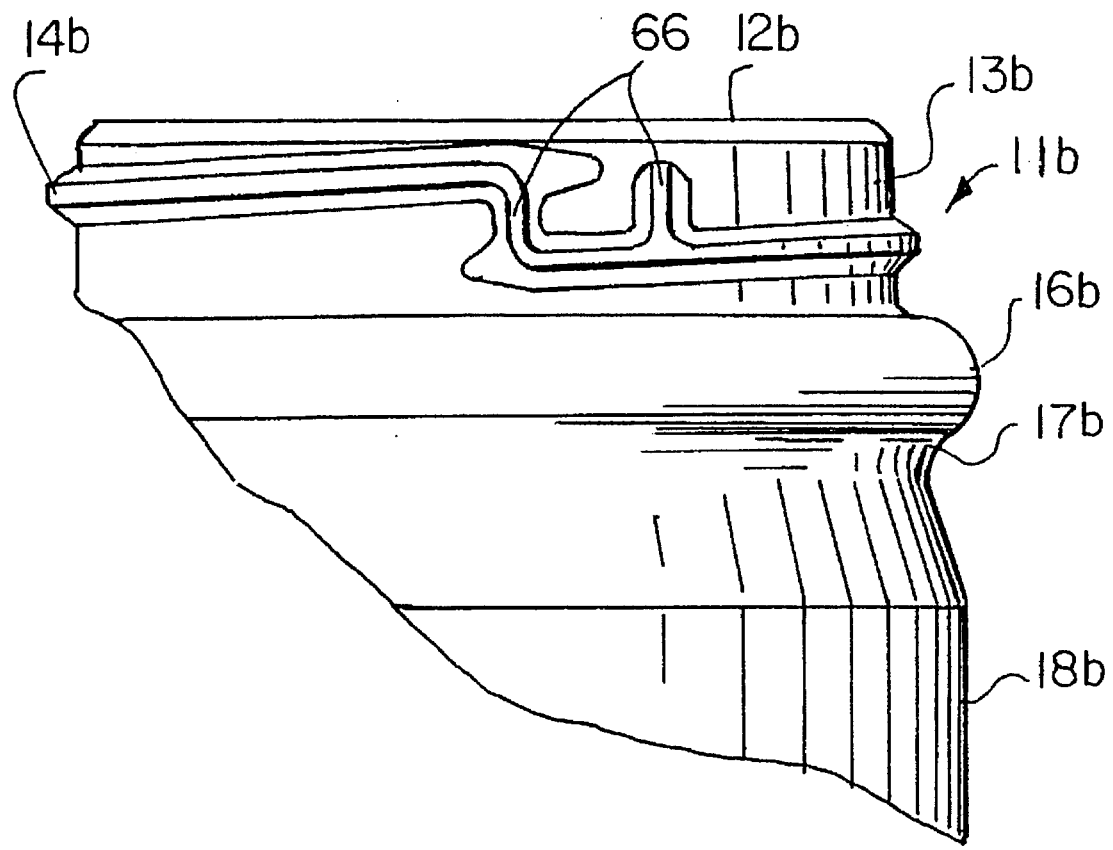
FIG. 5 is a view similar to a portion of FIG. 1 modification wherein the barriers to cap removal are located on the container neck rather than on the cap.

FIG. 5 illustrates a modification of either of the two previous structures. Upward extending barriers 66 are angularly spaced apart along external screw threads 14b of neck 11b. One barrier 66 extends up from the lower end of thread 14b to the level of the upper end of thread 14b. Other barriers 66 are angularly spaced apart along thread 14b. The cap (not shown) used with neck 11b of FIG. 5 is similar to that of FIG. 1 or 3 except that it needs no barriers. Barriers 66 function the same as barriers 26 of FIG. 1 to prevent the cap from being removed so long as it is intact.

The modifications of FIGS. 3 and 4 and FIG. 5 resemble those of the preceding modifications and the same reference numerals followed by subscripts a and b respectively.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In combination, a cap and a container having a neck having a lip, a cylindrical portion below said lip formed with an external first screw thread and a crown bead below said cylindrical portion, said cap comprising a top and a skirt depending from said top, said skirt having a restricted diameter cylindrical upper stretch formed with an internal second screw thread positioned and dimensioned when said cap is installed on said neck to mate with said first screw thread, an enlarged diameter stretch below said upper stretch positioned and dimensioned to engage said crown bead and an internal locking bead positioned and dimensioned to engage the underside of said crown bead, and at least one barrier integral with said skirt extending downward from said second screw thread and extending downward to a position to intersect said first screw thread to block unscrewing of said cap relative to said neck, said cap being formed of a resilient plastic whereby said second screw thread expands to slip over said first screw thread when said cap is pushed axially downward on said neck without relative rotation of said cap and said neck, said container having first orientation means, said cap further comprising second orientation means cooperable with said first orientation means whereby when said cap is pushed axially downward on said neck said first screw thread and said second screw thread are in registration.

2. A cap according to claim 1 which further comprises a gasket on the underside of said top to seal said cap to said lip.

3. A cap according to claim 2 in which said gasket is of foam plastic.

4. A cap according to claim 1 in which said skirt extends below said enlarged diameter stretch to a bottom edge, a tear tab extending below said bottom edge and a tear line formed in said skin adjacent said tear tab extending up from said bottom edge to said upper stretch.

5. A cap according to claim 4 in which said tear line is substantially vertically disposed and which further comprises a second tear line approximately parallel to said first-mentioned tear line disposed on the side of said tear tab opposite said first mentioned tear line extending up from said bottom edge to said upper stretch.

6. A cap according to claim 4 which further comprises at least one break in said internal locking bead whereby said tear line traverses said internal locking bead.

7. A cap according to claim 1 in which a well is formed in said top, the lower end of said well being open and which further comprises a plug slidable in said well between a first position sealing said well from the interior of said container to a second position opening communication from the interior to the exterior of said container.

8. A cap according to claim 7 in which said plug further comprises attachment means for detachably securing said plug to an external dispenser probe.

9. A cap according to claim 7 which further comprises an annular gasket on the underside of said top around said well to seal said cap to said lip.

10. A cap for use with a container neck having a lip, a cylindrical portion below said lip formed with an external first screw thread and a crown bead below said cylindrical portion, said cap comprising a top and a skin depending from said top, said skirt having a restricted diameter cylindrical upper stretch formed with an internal second screw thread positioned and dimensioned when said cap is installed on said neck to mate with said first screw thread, an enlarged diameter stretch below said upper stretch positioned and dimensioned to engage said crown bead and an internal locking bead positioned and dimensioned to engage the underside of said crown bead, said second screw thread extending helically from 0° of angle at an origin of said thread to approximately 360° of angle at a terminus of said thread and at least one barrier extending downwardly from approximately said 0° of angle to approximately said 360° of angle, said one barrier being integral with said skirt, and a plurality of downward extending second barriers integral with said skirt angularly spaced apart from said first-mentioned barrier and depending from said second screw thread.

11. In combination, a container neck and a cap, said container neck having a lip, a cylindrical portion below said lip formed with an external first screw thread and a crown bead below said cylindrical portion, said cap comprising a top and a skirt depending from said top, said skirt having a restricted diameter cylindrical upper stretch formed with an internal second screw thread mating with said first screw thread and an enlarged diameter stretch below said upper stretch shaped to engage said crown bead and an internal locking bead engaging the underside of said crown bead, at least one barrier extending substantially vertically downward relative to one of said screw threads to intersect the other said screw thread to block unscrewing of said cap relative to said neck so long as said cap is intact, said barrier being integral with said one of said screw threads and means to tear a portion of said skirt to release said cap from said neck, and said second screw thread extending helically from 0° of angle at an origin of said second screw thread to approximately 360° of angle at a terminus of said second screw thread and in which said at least one barrier is on said cap and extends downwardly from approximately 0° of angle of said second screw thread to approximately said 360° of angle of said second screw thread.

12. In combination, a container neck and a cap, said container neck having a lip, a cylindrical portion below said lip formed with an external first screw thread and a crown bead below said cylindrical portion, said cap comprising a top and a skirt depending from said top, said skirt having a restricted diameter cylindrical upper stretch formed with an internal second screw thread mating with said first screw thread and an enlarged diameter stretch below said upper stretch shaped to engage said crown bead and an internal locking bead engaging the underside of said crown bead, at least one barrier extending substantially vertically downward relative to one of said screw threads to intersect the other said screw thread to block unscrewing of said cap relative to said neck so long as said cap is intact, said barrier being integral with said one of said screw threads and means to tear a portion of said skirt to release said cap from said neck, and in which said first screw thread extends helically from 0° of angle at an origin of said first screw thread to approximately 360° of angle at a terminus of said first screw thread and in which said at least one barrier is on said neck and extends upwardly from approximately said 360° of angle of said first screw thread to approximately 0° of angle of said first screw thread.

\* \* \* \* \*